3,249,593
PROMOTING FREE RADICAL POLYMERIZATION WITH SULFONATES
John C. Munday, Cranford, and Dilworth T. Rogers, Summit, N.J., assignors to Esso Research and Engineering Company, a corporation of Delaware
No Drawing. Filed Sept. 11, 1961, Ser. No. 137,066
7 Claims. (Cl. 260—80)

This invention relates to the polymerization of unsaturated materials to form polymers and copolymers that are useful as plastics and lubricating oil additives. The invention is still more particularly directed to the use of certain promoters in conjunction with free radical catalysts for the polymerization of unsaturated compounds.

It has been known in the art that valuable products can be prepared by the polymerization of certain unsaturated acids and of certain unsaturated esters. Many of these polymers that are mineral-oil-soluble have the ability of improving the viscosity-temperature characteristics and/or the low temperature pour point properties of lubricating oils when added thereto. Some of the mineral-oil-soluble polymers may be used as detergents in lubricating oil compositions or as sludge dispersants in heating oils. Some polymers are water-dispersible and can be used as adhesives. Still other polymers are both oil-insoluble and water-insoluble plastics.

The materials that are polymerized in accordance with the present invention include acrylates, acrylic acid, methacrylates, fumarates, maleates, vinyl esters and copolymers thereof, as well as mixtures of the polymers mentioned. The polymerization of the unsaturated esters is conveniently conducted with the aid of what are known as free radical catalysts. Such catalysts include benzoyl peroxide, lauroyl peroxide, tert.-butyl hydroperoxide, tert.-butyl perbenzoate, and azodiisobutylronitrile.

In many instances there has been a need for improving either the rate of polymerization or the yield of polymer obtained when polymerizing unsaturated esters. This has resulted in a continuing search for more satisfactory catalysts or for promoters for the commonly used catalysts.

In accordance with the present invention, it has been found that the polymerization of unsaturated compounds in the presence of a free radical catalyst of the type mentioned above can be promoted by adding an alkaline earth metal sulfonate to the composition being polymerized. In addition, the products of the invention are improved by the presence of the sulfonate, in anti-oxidant properties, resistance to discoloration and deterioration by light and heat, and/or plasticity.

The invention is particularly applicable to solution polymerization wherein the monomer is completely dissolved in a solvent and the polymerizing catalyst is added to the homogeneous system. The solvents include naphtha, lubricating oil, white oil, benzene, toluene, esters, ethers, chlorinated solvents, and the like.

If the polymer being prepared is to be used in a mineral lubricating oil or fuel oil and the polymerization takes place in a volatile solvent, it is convenient to add the concentrated solution of the polymer to a mineral oil and then distill off the solvent, leaving the polymer as a concentrate in the mineral oil. This concentrate is then available for addition to a hydrocarbon fuel or to a lubricating oil in the desired proportion. In general, such polymers are employed in concentration of from about 1 to 15 weight percent for imparting sludge dispersancy and/or viscosity improving properties to lubricating oils. and in concentrations in the range of about 0.002 to 0.1 weight percent when used as sediment or sludge dispersants in fuel oils.

The invention is applicable to the polymerization of any of the classes of unsaturated compounds whose polymers have been found useful as insoluble plastics, as water-soluble thickeners, and as oil-soluble heating oil and lubricating oil additives. Unsaturated esters that can be used are of two general groups; i.e., esters of unsaturated alcohols and esters of unsaturated acids. The former include the vinyl, allyl, crotonyl and oleyl esters of such acids as acetic, propionic, butyric, 2-ethyl caproic and stearic acids, for example. Specific compounds which can be mentioned are vinyl acetate, vinyl butyrate, and the like. The esters of unsaturated acids include the alcohol esters of acrylic acid, methacrylic acid, and alpha, beta-unsaturated polycarboxylic acids such as fumaric, maleic, itaconic, etc. In general, the alcohols used in preparing the latter esters are selected from $C_1$–$C_{20}$ aliphatic alcohols such as methyl, butyl, octyl, isooctyl, 2-ethylhexyl, nonyl, 2,2,4,4-tetramethyl amyl, decyl, eicosyl, dodecyl, tetradecyl, cetyl, and stearyl. More specifically, methyl methacrylate, nonyl acrylate, and dodecyl fumarate can be used. In addition, free acids such as acrylic and methacrylic acids may be polymerized by the method of the invention.

Commercially marketed mixtures of alcohols consisting essentially of saturated aliphatic alcohols having the requisite chain length may also be used in preparing the esters to be polymerized. One such mixture prepared by the hydrogenation of coconut oil is sold under the tradename "Lorol" and comprises saturated aliphatic alcohols containing from 8 to 18 carbon atoms per molecule. This mixture consists chiefly of lauryl alcohol having 12 carbon atoms per molecule. A representative composition contains about 4 weight percent $C_{10}$; 56 wt. percent $C_{12}$; 22 wt. percent $C_{14}$; 14 wt. percent $C_{16}$; and 4 wt. percent $C_{18}$ alcohols. Tallow alcohol is a similar mixed product obtained by hydrogenation of tallow fat and consists primarily of cetyl and stearyl alcohols.

Oxo alcohols may also be employed. These are well known in the art and can be prepared by reaction of olefins with carbon monoxide and hydrogen in the presence of a suitable catalyst such as cobalt or other Group VIII metal. The products are chiefly alcohols and aldehydes containing one more carbon atom than the starting olefin. The aldehydes in the product are then hydrogenated in a separate catalytic stage to convert them to the corresponding alcohols. Thus, $C_8$ oxo alcohols can be prepared from $C_7$ olefins in this manner. These are predominantly branched chain alcohols consisting principally of isomers of the formula:

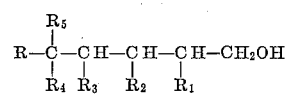

where R stands for methyl or ethyl and $R_1$, $R_2$, $R_3$, $R_4$ and $R_5$ stand for hydrogen or methyl groups, and wherein $R_1$ plus $R_2$ plus $R_3$ plus $R_4$ plus $R_5$ contain up to 2 carbon atoms. A typical $C_8$ oxo alcohol consists of about 29% of 3,5-dimethylhexanol, 25% of 4,5-dimethyl hexanol, 17% of 3,4-dimethyl hexanol, 16% of 4-methyl heptanol plus 5-methyl heptanol, 2% of 4-ethyl hexanol and 9% of other alcohols.

The alkaline earth metal sulfonates used in the practice of this invention are well known in the art and are prepared by neutralizing sulfonic acids with the oxides and/or hydroxides of alkaline earth metals, preferably calcium or barium. The neutral sulfonates are preferred. Sulfonic acids can be obtained by sulfonation of either natural or synthetic hydrocarbons, as for example by treatment of lubricating oil base stocks with concentrated or fuming sulfonic acid or by sulfonating alkylated aromatic hydrocarbons such as didodecyl benzene. The preferred sulfonic acids are those having molecular weights in the range of 300 to 500. It is convenient to employ commercially available concentrates of the alkaline earth metal sulfonates, as for example a 50% concentrate in mineral lubricating oil.

The amount of sulfonate used may range from about 0.01 to about 5 wt. percent, and preferably ranges from about 0.1 to about 3 weight percent, of the monomer or monomer mixture being polymerized. It is used in conjunction with from about 0.1 to about 2 wt. percent of a free radical catalyst of the types mentioned above. Polymerization temperatures may range from about 50 to about 150° C. and reaction times will range from about ½ to 50 hours.

The following examples serve to illustrate the invention:

*Example 1*

A commercially available methyl methacrylate, diluted with an equal weight of normal heptane, was polymerized at 80° C. under a blanket of nitrogen for 2.5 hours using 1 wt. percent of tert.-butyl perbenzoate as catalyst. Two separate quantities of methyl methacrylate were polymerized in the same manner with the same amount of catalyst but with 0.5 wt. percent of neutral calcium sulfonate or neutral barium sulfonate added to the batch. The sulfonate was added as a 50% solution in mineral oil. The sulfonic acid in the sulfonate had been prepared by sulfonation of a mineral lubricating oil having a viscosity of 60 SUS at 210° F., and had a molecular weight of 460. The yields obtained are shown in Table I:

TABLE I

| | Polymer yield weight percent |
|---|---|
| Without sulfonate | 19.8 |
| With calcium sulfonate | 31.2 |
| With barium sulfonate | 27.5 |

It will be seen that addition of the calcium sulfonate as a promoter gave an increase in yield of more than 50% as compared with the polymerization without the promoter. The polymer yields were determined by adding methanol to the solution to precipitate the polymer, decanting liquid from the precipitate and weighing the precipitate after it had been dried under vacuum.

*Example 2*

A portion of freshly distilled acrylic acid was diluted to 20 vol. percent concentration with normal heptane and polymerized at 80° C. for 4 hours under a blanket of nitrogen using 1 wt. percent of tert.-butyl perbenzoate as catalyst. Two separate batches were similarly polymerized with the exception that one of them contained an added 0.5% of a neutral calcium sulfonate and the other contained 0.5% of a neutral barium sulfonate, both being added as a 50% solution in mineral oil. These sulfonates were the same as were used in Examples 1. The results are compared in Table II:

TABLE II

| | Polymer yield weight percent |
|---|---|
| No sulfonate added | 4.8 |
| Calcium sulfonate added | 31.6 |
| Barium sulfonate added | 70.0 |

The foregoing examples have been presented to illustrate the invention and are not intended to limit the invention in any manner. The scope of the invention is defined by the appended claims.

What is claimed is:
1. In the polymerization of an unsaturated compound selected from the group consisting of unsaturated aliphatic acids and unsaturated esters of aliphatic alcohols in the presence of a free radical catalyst wherein said unsaturated compound is dissolved in a solvent, the improvement which comprises promoting the polymerization by adding to the mixture of monomer and catalyst from about 0.01 to about 3 weight percent of an alkaline earth metal salt of a hydrocarbon sulfonic acid having a molecular weight in the range of from about 300 to about 500.
2. Polymerization process as defined by claim 1 wherein said unsaturated compound comprises acrylic acid.
3. Polymerization process as defined by claim 1 wherein said unsaturated compound comprises an alkyl methacrylate.
4. Polymerization process as defined by claim 1 wherein said catalyst comprises a peroxide catalyst.
5. Polymerization process as defined by claim 1 wherein said metal salt comprises a neutral barium sulfonate.
6. Polymerization process as defined by claim 1 wherein said metal salt comprises a neutral calcium sulfonate.
7. In the polymerization of an unsaturated compound dissolved in a solvent and selected from the group consisting of $C_3$ to $C_5$ unsaturated aliphatic acids and unsaturated esters of $C_1$ to $C_{20}$ aliphatic alcohols in the presence of a free-radical catalyst, at a temperature in the range of about 50 to about 150° C. the improvement which comprises promoting the polymerization by adding to the mixture of monomer and catalyst from about 0.01 to about 3 wt. percent of an alkaline earth metal salt of a hydrocarbon sulfonic acid having a molecular weight in the range of from about 300 to about 500.

References Cited by the Examiner

UNITED STATES PATENTS

| 2,524,084 | 10/1950 | Rust | 260—80 |
| 2,643,995 | 6/1953 | Park | 260—78.5 |

JOSEPH L. SCHOFER, *Primary Examiner.*

JOSEPH R. LIEBERMAN, *Examiner.*